United States Patent [19]

Schuldink

[11] B 4,003,591

[45] Jan. 18, 1977

[54] PLASTIC SOCKET MADE OF FIBRE REINFORCED THERMOSETTING RESIN MATERIAL

[75] Inventor: Gerrit Schuldink, Ommen, Netherlands

[73] Assignee: Industriele Onderneming Wavin N.V., Netherlands

[22] Filed: Dec. 8, 1972

[21] Appl. No.: 313,280

[44] Published under the second Trial Voluntary Protest Program on April 6, 1976 as document No. B 313,280.

[30] Foreign Application Priority Data

Dec. 14, 1971  Netherlands ...................... 7117092

[52] U.S. Cl. ................................ 285/110; 285/231; 285/345; 285/369; 285/379; 285/383; 285/423
[51] Int. Cl.[2] ......................................... F16L 17/02
[58] Field of Search .......... 285/110, 230, 231, 345, 285/369, 381, 423, 379, 383; 277/DIG. 2

[56] References Cited

UNITED STATES PATENTS

| 1,909,478 | 5/1933 | Wilson | 285/379 X |
|---|---|---|---|
| 2,245,153 | 6/1941 | McWone | 285/231 |
| 2,991,092 | 7/1961 | MccKay | 285/231 X |
| 3,381,715 | 5/1968 | Michael | 285/423 X |
| 3,649,053 | 3/1972 | Synder | 285/110 |
| 3,695,639 | 10/1972 | Shire | 285/231 X |
| 3,791,678 | 2/1974 | Putter | 285/110 |
| 3,796,447 | 3/1974 | Putter | 285/379 |

FOREIGN PATENTS OR APPLICATIONS

| 619,567 | 4/1961 | Italy | 285/110 |
|---|---|---|---|
| 406,757 | 8/1966 | Switzerland | 285/110 |

*Primary Examiner*—Dave W. Arola
*Attorney, Agent, or Firm*—Watson, Cole, Grindle & Watson

[57] ABSTRACT

Plastic socket of fibre reinforced thermosetting material comprising an inner push edge, a first recess at each end for positioning sealing means, which are held by means of a retaining ring which is accommodated in a second recess. The inner wall between the first recess and the push edge tapers outwardly.

8 Claims, 2 Drawing Figures

PLASTIC SOCKET MADE OF FIBRE REINFORCED THERMOSETTING RESIN MATERIAL

BACKGROUND OF THE INVENTION

My invention relates to a plastic socket suitable to connect two pipes.

Such plastic sockets made of thermoplastic material are commonly known. They are for example manufactured by injection moulding, and are subsequently subjected to mechanical operations to form grooves in the plastic socket, which grooves serve to receive sealing rings or collars. It is obvious that these operations, for which much labour is required, cause a rise of the cost price of such plastic sockets.

On the other hand, it is also possible to manufacture these plastic sockets, like for example those made of polyvinylchloride, by a blowing process, whereby a pipe part is enclosed by a mould and thereupon the plastic-made pipe part, plasticised by heating, is pressed against the inner wall of the mould due to inflation. When the inner wall is profiled in a suitable way a plastic socket with the required recesses is obtained.

The latter method has the disadvantage that the inside measurement of the socket obtained is very inexact, while the differences in the wall thicknesses in the starting product manifest themselves still stronger in the final product. One is often compelled to use more material for such plastic sockets than is necessary, since the strength of the socket is determined by the location of the smallest thickness.

SUMMARY OF THE INVENTION

The invention aims to provide a plastic socket which can be manufactured in a simple way and provided with all desired recesses, while a minimal quantity of material suffices for the manufacture of the socket.

According to the invention this object is attained by an arrangement in which a plastic socket is provided with at least one inner push edge and annular grooves situated in the vicinity of the two ends for receiving sealing means. The arrangement is characterised in that the socket, which consists of fibre reinforced thermosetting resin, further comprises a cylindrical or truncated conical recess, extending in the direction of the push edge, and a second recess, extending in the direction of the free end.

When using such a plastic socket, which can be obtained by winding, one can advantageously establish excellent connections between pipe parts, in a simple way.

According to a preferred embodiment, the fibre reinforcement comprises besides radially or helically extending fibre reinforcements, at least one axially extending fibre reinforcement.

The reinforcing fibres consist advantageously of reinforcing glass filaments.

The invention relates also to a method for manufacturing a socket from fibre reinforced thermosetting resin material by winding reinforcing fibres around a mandril and applying resin to these fibres. The mandril, which is constructed such that it can be removed from the socket after the resin has hardened, is provided with at least one groove for the formation of an inner push edge on the socket and with annular projections situated in the vicinity of the ends, and, situated on either side thereof and adjoining these projections with first cylindrical or truncated conical surfaces and second surfaces either cylindrical or not, the second surfaces ending before a cylindrical hollow the bottom of which is spaced farther from the axis of the mandril than the bottom of the aforementioned groove, whereupon, after the resin has been applied, the whole is caused to harden and subsequently the mandril is removed from the inner side of the socket.

It has been proved to be particularly advantageous that the inner diameter of the socket substantially progressively increases in the direction of the push edge from the end of the first recess. In that case an inserted pipe end will be capable of turning to a certain extent with respect to the socket. Such a turning is of great importance since pipes may be easily slightly moved, owing to particular landslips, whereby the socket might be damaged.

The invention is hereinafter clarified with reference to the accompanying drawing in which an embodiment is represented.

DESCRIPTION OF THE PREFERRED EMBODIMENT

Figure 1:
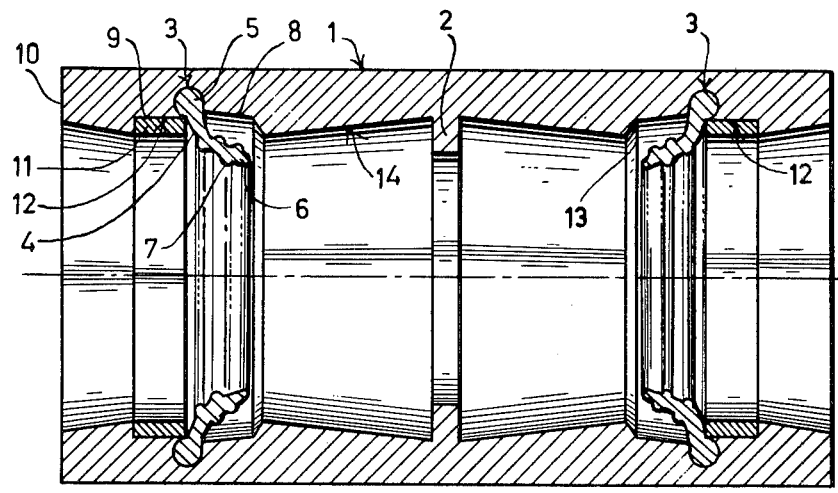
FIG. 1 is a section through a plastic socket according to the invention.
Figure 2:
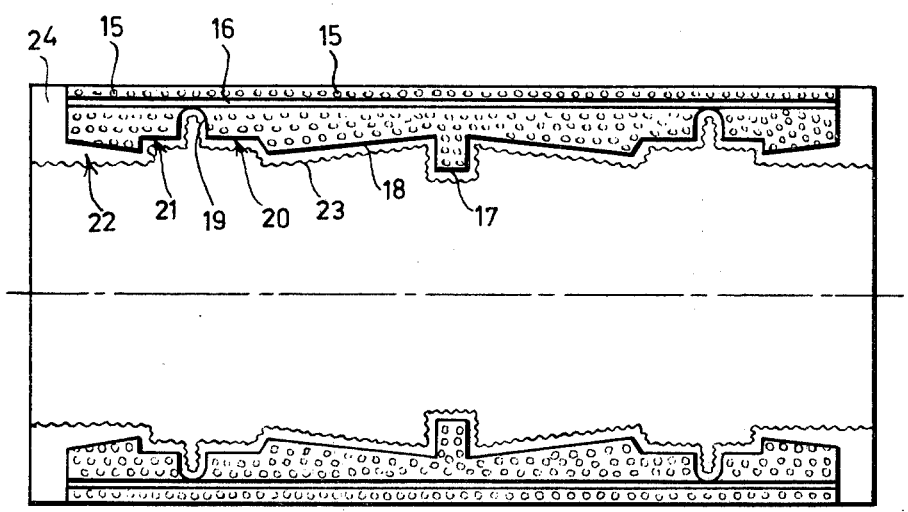
FIG. 2 represents a mandril having wound thereon a variant of a plastic socket according to FIG. 1.

In FIG. 1, a plastic socket 1 is shown which consists of fibre reinforced thermosetting resin. This plastic socket is provided with an inner push edge 2 for stopping a pipe part penetrating into the socket. This penetrating pipe part is not shown.

In the vicinity of each end, a groove 3 is provided for receiving sealing means 4. The sealing means 4 consist of an annular body 5 and connected therewith a sealing skirt 6 provided with projections 7.

On either side of the groove is a first truncated conical recess 8, situated beside each groove 3, and a second annular recess 9, extending in the direction of the free end 10 of the plastic pipe. The annular recess 9 can evidently also possess a truncated conical surface.

A retention ring 11 for retaining the sealing skirt 6 is provided; this ring is preferably made of thin-walled thermoplastic material which due to deformation can be introduced into the socket and, when this deformation is cancelled the ring can be accommodated in the second recess 9. Conveniently a glue layer 12 is applied between the ring 11 and the inner wall of the recess 9. It will be obvious that the retention ring may also consist of a ring with an outer diameter greater than that of the ring 9, while in that case the part of the sealing means 4, situated in the groove 3 has a recess in which comes to lie the retention ring. In that case, the retention ring will be situated outside the second recess 9.

When a penetrating pipe part penetrates into the socket 1 the sealing skirt 6 will be located in position in the recess 8 and cooperate with the outer wall of a penetrating pipe part while ensuring a proper sealing.

In order to allow a certain movement of the penetrating pipe part with respect to the inner side of the socket, the latter is constructed in such a way that the inner diameter from the end of the first recess 8, this end being denoted by 13, increases gradually in the direction of the push edge 2. As a consequence a truncated conical recess 14 is obtained. Preferably the conicalness of the surface of the conical recess 14 corresponds with the conicalness of the surface which delimits the recess 8.

The socket is manufactured from glass fibre material, a plurality of windings being provided in the radial direction, while a fibre layer 16 extending in the longitudinal direction is applied in order to obtain an optimal strength.

The starting point for the manufacture of a socket from fibre reinforced thermosetting material is a mandril constructed from various segments which with respect to each other can be moved inwardly. Such mandrils are known per se. Reference is made for instance to the German Patent specification 1.262.570. The various segments of the whole constitute together the outer side of the mandril. The outer side is provided with a groove 17 for the formation of the abutment edge 2 of the socket.

The mandril is further provided with a truncated conical surface 18 extending from the vicinity of the groove 17 in the direction of an annular projection 19 disposed in the proximity of the end of the mandril. This truncated conical surface 18 merges now, however, via a first cylindrical surface instead of a conically extending surface 20, into the protruding ring 19.

Beyond the ring 19 is the cylindrical surface 21 and beside it there is a hollow 22 for the formation of the end of the socket.

Heating spirals 23 for the supply of heat are preferably disposed in the mandril along the outer wall thereof.

At first fibres 15 are wound in a radial direction on the mandril which is in an expanded condition, the operation is continued until the parts beside the protruding ring 19 are filled up with fibres. These fibres in the shape of endless filaments are, prior to being applied to the mandril, passed through a bath of liquid thermosetting resin. Preferably polyester or epoxy resin are used.

After the provision of the first windings a so-called unidirectional glass tissue is applied. This tissue contains substantially longitudinal filaments for reinforcement of the whole. Subsequently glass fibres impregnated with thermosetting resin are radially wound around this layer 16 of longitudinal filaments until the desired thickness is obtained. This thickness of the mandril depends on the required properties.

Thereupon heat is supplied via the heating spirals 23 so that the thermosetting resin can harden.

Finally the various parts of the mandril are moved inwardly so that the mandril can be removed from the socket.

What I claim is:
1. A socket of fibre reinforced thermosetting resin comprising: at least one inner push edge; annular grooves each situated in the vicinity of a respective free end of the socket for receiving sealing means; first recesses each opening into a respective one of said grooves and extending in the direction of said push edge, the inner diameter of said first recess being greater than the smallest inner diameter of said free end of the socket; two retaining rings; second recesses each opening into a respective one of said grooves and accommodating a corresponding one of said retaining rings, and each said second recess extending in the direction of said free end and having an inner diameter sufficiently large so as to accommodate the inner diameter of said corresponding retaining ring, the inner diameter of said corresponding retaining ring being at least equal to the smallest inner diameter of the socket adjacent the end of said second recess closest to said free end of the socket; the inner diameter of the socket starting from a position near the end of said first recess increases gradually in the direction of said push edge so as to form a further recess having a truncated conical shape; and a conical entrance provided within the socket between said second recess and said free end of the socket.

2. A socket according to claim 1 wherein said first recess has a cylindrical shape.

3. A plastic socket according to claim 1, wherein the fibre reinforcement comprises both radially extending fibre reinforcements and at least one axially extending fibre reinforcement.

4. A socket according to claim wherein said first recess has a truncated conical shape.

5. A plastic socket according to claim 4, wherein the conicalness of said first recess corresponds with, but is orientated opposite to, the conicalness of said further recess.

6. A plastic socket according to claim 1, the socket further comprising a sealing member situated in each said groove, each sealing member having a sealing skirt, and wherein said retaining ring is arranged within each said second recess for retaining said sealing member.

7. A socket according to claim 6, wherein said retaining ring is made of a thin-walled thermoplastic material and is situated in said second recess in such a manner as to extend into the area of said groove.

8. A socket according to claim 1, wherein the reinforcing fibres are glass filaments.

* * * * *